Patented Nov. 15, 1938

2,136,402

UNITED STATES PATENT OFFICE 2,136,402

POLISH

Joseph A. Tumbler, Baltimore, Md., assignor to J. A. Tumbler Laboratories, Baltimore, Md.

No Drawing. Application August 3, 1934, Serial No. 738,297

7 Claims. (Cl. 134—24)

My invention relates to chemical compositions, and more particularly, relates to novel polishes for lacquered or enameled surfaces such as are found on automobile bodies and the like, and also relates to a novel process for making the said compositions.

On exposure to the action of the weather, all oleo-resinous, nitro-cellulose lacquer, and synthetic resin coatings or finishes deteriorate. This deterioration is more particularly due to the action of the ultra-violet portions of the sun-light rays from sunshine, and to a lesser extent is also due to the action of rain, wind and its accompanying dust.

The manifestation of this deterioration is exhibited as a decrease in gloss or luster, by the appearance of "bloom" or efflorescence, and by cracking, checking or chalking of the surface layer of the finish. These surface conditions are such, that they materially alter the appearance of a finish, causing colored coatings to appear either faded or darkened, and decreasing the transparency of clear finishes.

Thus the weathered finish is pictured as having a very erose surface and discontinuous structure. Loosened surface pigment particles have left pits and mounds. Cracks have been widened and deepened, producing the appearance of a more or less weathered mud flat. The structure of the embrittled and hardened finish below the surface is cracked by temperature changes and vibration so that it has interfaces of cleavage intersecting in all directions. This makes the relatively optically homogenous or transparent material a much lighter color due to the light reflected from cleavage interfaces below the surface. This lightening of color is analogous to the whiteness of snow, composed of transparent crystals.

All of the above manifestations result from oxidation or reduction. The term "oxidation" having by common usage become descriptive of the mentioned types of coating-failure, it will be used in speaking of finish-failures in the following text, but always differentiating, by the use of quotation marks, from chemical oxidation, which is also referred to in the present application.

The primary function of a polish is to remove as much as is possible of the "oxidized" or weathered finish which is loosely adherent to the surface, and thereafter to impregnate and coat the surface with a material which will fill and bridge over the pits, cracks and crevices and produce a uniformly hard, dry and lustrous surface.

It is also a desirable quality of a polish, to produce a surface which is of a protective nature, in that it will serve to diminish the speed with which "oxidation" progresses.

Besides, "oxidation", which proceeds mainly at the finish surface, there are other changes which go deeper into the finish and which may be remedied. One of these is the continued polymerization of oils used in finishes. This results in brittleness and in loss of elasticity. In lacquers, the evaporation of plasticizers, e. g., dibutyl-phathalate, etc., also results in brittleness, and loss of adhesion and flexibility.

A further function of a good polish is to penetrate the substance of the dried out finish itself, restoring the properties of elasticity and resilience.

There are many liquid materials which might be applied to a weathered finish to achieve the results just described. Varnishes, solutions of synthetic or natural resins, drying or other fatty oils, or even solutions of nitrocellulose function in this way. The antiquated, acid-emulsion polish containing either varnish or linseed oil stabilized by butter of antimony produces a film of this type. However, such materials are invariably sticky. After applying them to a surface with a cloth, a smeary finish is produced which it is practically impossible to rub dry and which holds lint from the cloth and gathers dust and dirt.

The more efficient of these materials are the resin solutions and some blown oils. These more efficient materials possess light refractive properties very similar to those of the commonly used finishes. Upon their penetrating a crack, cleavage interface or by filling a pit, they appear to unite the discontinuous substance of the finish, restoring the lustre and original color. Such materials solve the problem of restoring optical homogeneity to the finish. They can also be selected to give films which dry, either by evaporation of solvents or by air oxidation, to give hard, protective films. They cannot, however, be applied simply and easily to give smooth surfaces. Painting with a brush or daubing with a cloth gives most unsatisfactory results as regards smoothness. Spraying of solutions is practiced as a restorative and protective measure for finishes, but only experienced and skilled operators can secure satisfactory results by this method of application.

Heretofore it has been proposed to use an emulsion of mineral oil in which an abrasive is suspended which loosens and assists in the removal of oxidized particles, leaving a film of mineral oil on the surface. The film of mineral oil cannot become a part of the lacquered surface, and accordingly is gradually lost by volatilization and absorption in a cloth wiping over the surface.

As described in my application Serial No. 392,493, filed September 13, 1929, now Patent No. 1,969,387, dated August 7, 1934, of which this is a continuation in part, it is essential that a good polish have a high refractive index, similar to that of the oils or resins and nitrocellulose found in the finish itself, in order to secure satisfactory depth and lustre. Otherwise scratches and pits will not be hidden and other surface irregularities will show up the surface film as being superimposed. Similarly of light refractivity of the polish and of the finish results in optical uniformity and invisibility of any dividing line between the substance of one and the other. A polish of highly refractive, film-forming materials (castor oil) was described in the above-identified application of Joseph A. Tumbler.

I have discovered that castor oil, especially blown castor oil, which is a plasticizer for nitrocellulose lacquers and other oil and resin-containing compositions, also possesses high surface tension compared with other oils. A film of castor oil formed over the irregular surface tends to smooth itself out, reducing the interstices and other unevenesses. The smooth film thus obtained has gloss and lustre, comparable with that of new finishes.

Castor oil is a fluorescent substance and accordingly absorbs ultra-violet rays, preventing these destructive rays from reaching and injuring the lacquered surface. At the same time, it is readily polymerized, becoming harder upon exposure, retaining its smooth transparent nature, becoming more resistant to ultra-violet transmission.

Castor oil decreases the water permeability of films comprised of nitrocellulose and its addition to a polish for surfaces coated with nitrocellulose lacquers materially aids in prolonging the life of such coatings because water is particularly destructive to lacquer finishes.

The essence of my invention in the above-mentioned application is the discovery of a method of easily applying a thin, uniform film of a blown oil belonging to what is known as the ricinoleic acid group or the castor oil group to a finish. This consists of emulsifying with water, the castor oil together with about three times its volume of a light petroleum oil, with which the castor oil is immiscible.

As described in the Tumbler application, the ingredients containing the castor oil are thoroughly mixed and then passed through a colloid mill to disperse or break up the particles. This dispersion is very important both from the point of view of the process of manufacture to prevent clogging and for obtaining a better end product.

The extent to which these particles are finely divided determines the stability of the emulsion.

Accordingly, an object of my invention is to provide a novel process for manufacturing a polish.

A further object of my invention is to provide a homogenizer for dispersing the particles of a polish.

Another object of my invention is to provide a novel polish for lacquered surfaces.

A further object of my invention is to provide a homogenizer for dispersing the particles of a polish containing castor oil.

Still another object of my invention is to provide novel apparatus for and methods of producing a table polish emulsion.

Still a further object of my invention is to provide novel apparatus for and methods of producing a stable polish emulsion containing castor oil immiscible in a mineral oil.

There are other objects of our invention which together with the foregoing will appear in the detailed description which is to follow.

Before proceeding with a detailed description of my invention, a brief glossary of the various terms used in this specification adapted from the paint technology will be given to aid in an understanding of the invention.

Bloom—refers to a surface condition caused by microscopic flake-like separations of the surface layers of a finish causing blues to appear reddish or purple and blacks to appear purple or gray, and producing cloudiness in clear finishes.

Cracking—refers to radial crevices extending from the surface to the next succeeding lower layer and in the horizontal plane chiefly extending in more or less curved lines which do not intersect.

Checking—is a condition similar to cracking except that the cracks or crevices cross each other to form a hatch-work of more or less uniformity of pattern.

Chalking—is a condition caused by destruction of the surface layer of the binding medium in an oleo-resinous synthetic- or nitrocellulose enamel. This results in some of the pigment comprising the coloring matter becoming loose on the surface, leaving the surface in a condition in which the coloring matter is easily brushed or rubbed off. The undersurface of a coating which has "chalked" is usually pitted.

In the following the percentages by weight of various formulae used in making the preferred polish are given:

I

Formula using triethanolamine and gelatine as emulsifying agent:

|  | Percent |
|---|---|
| Water | 50.69 |
| Mineral oil | 25.85 |
| Blown castor oil | 10.16 |
| Triethanolamine | 0.68 |
| Red oil | 0.90 |
| Orthodichlorbenzene | 2.92 |
| Mineral spirits | 7.72 |
| Oil citronella spirits | 0.92 |
| Gelatine | 0.15 |

II

Formula using caustic potash as emulsifying agent:

|  | Percent |
|---|---|
| Water | 52.87 |
| 46% caustic potash | 0.40 |
| Red oil | 0.82 |
| Mineral spirits | 8.94 |
| Orthodichlorbenzene | 0.99 |
| Blown castor oil | 9.49 |
| Mineral oil | 25.67 |
| Oil citronella substitute | 0.68 |

III

Preferred formula using caustic potash, gelatine, powdered gum arabic and powdered gum tragacanth as emulsifying agents:

|  | Percent |
|---|---|
| Red oil | 0.81 |
| Mineral spirits | 7.48 |
| Oil citronella substitute | 0.54 |
| Orthodichlorbenzene | 1.24 |
| Blown castor oil | 8.14 |
| Mineral oil | 24.26 |
| Gum arabic | 0.034 |
| Gum tragacanth | 0.011 |

IV

Formula III and the following:

| | Percent |
|---|---|
| Water | 56.89 |
| 46% caustic potash | 0.45 |
| Gelatine | 0.136 |

V

Range over which these products may vary:

| | Percent |
|---|---|
| Water | 50 –70 |
| Red oil | 2.0– 0.5 |
| Mineral spirits | 15 – 9.0 |
| Orthodichlorbenzene | 5.0– 1.0 |
| Oil citronella substitute | 2.5– 1.0 |
| Blown castor oil | 15.0– 6.0 |
| Mineral oil | 35.0–20.0 |
| 46% caustic potash | 2.0– 0.2 |
| Gelatine | 0.5– 0.1 |
| Gum arabic | 0.5– 0.1 |
| Gum tragacanth | 0.5– 0.1 |

Blown castor oil is the film-forming material referred to generally above. It is highly adherent and penetrating and its refractive index is of the same order as that of lacquer or enamel finishes. It also resembles the general group of oils and other highly refractive liquids mentioned above in that it cannot be applied alone simply and easily for it holds lint from the cloth and is too completely removed by continued rubbing with a dry cloth to give much of a protective film. However, in the above formulae it is dispersed along with about three times its volume of a light mineral oil, with which it is not miscible.

In use, when the polish is applied to the surface, the water largely evaporates, and a mixture of castor oil and mineral oil are rubbed over and into the surface. The castor oil is highly adherent and sticks to the finish, filling cracks and pits and because of the selective wetting of the finish by the castor oil, it displaces the mineral oil leaving the latter as a second film over and on top of the castor oil film. This film of mineral oil acts as a lubricant to permit massaging of the castor oil into more intimate contact with the surface in rubbing without actual contact of the sticky castor oil film with the polishing pad. In this way a continuous, penetrating, restorative and protective film is easily produced and with very little effort.

The excess of mineral oil is absorbed by the polishing cloth leaving a very smooth, highly lustrous finish.

In these preparations, the water in which the oils are dispersed performs the role of a carrier. It is not necessary that the oils be dispersed in water to secure the desirable results described in the foregoing paragraph, but this dispersion serves in the twofold purpose of providing dilution for ready use and to insure uniform mixing of the castor oil and mineral oil so that consistent results may be obtained.

A stable dispersion of castor oil in mineral oil may be obtained by means of a suitable protective colloid such as a small amount of gas-proofed China-wood oil. Moreover, dispersions of castor oil in a semi-solid, as petrolatum have been made which give good results and are stable. The inclusion of water permits a certain amount of cleaning action which is not obtained with straight oil mixtures, but is not essential except to preserve the correct proportions of the ingredients in the preparation.

The castor oil described in the above-mentioned application is pale blown. Castor oil can be variously treated by blowing to give products of viscosities ranging from that of raw castor oil about 130 secs., Saybolt at 100° F., or less to gummy solids, and these results can be duplicated by other treatments of castor oils than blowing to give the same physical and chemical products. Thus, although this pale blown oil, which has a viscosity of about 400 secs., Saybolt at 100° F., and which is described as an oxidized oil, gives the best results, it is not necessary that the oil be of this particular type. Raw or heavier blown castor oils may be used to give polish films which give more or less lustre and more or less tackiness, respectively.

Instead of blowing castor oil, it may be chemically treated or processed. The treatments are:

1. Treatment by nitration.
2. Treatment with sulphur chloride.
3. Partial hydrogenation of raw or blown oil, partial or complete. Completely hydrogenated castor oil would not have sufficient penetrating power for best results on automobile or other enamel or lacquer finishes, whereas partial hydrogenation will reduce the tackiness—which is the main object of the polish.
4. Condensation of organic acids with blown castor oil. The process of blowing produces intermediate products some of which are acidic. These intermediate products react to form stable condensation materials, but the intermediate products are not all produced in balanced proportions to be reabsorbed by the final reaction. The final absorption of acidic materials continues for a few days after processing and blown castor oil will absorb, slowly at ordinary temperature and more rapidly at elevated temperatures, a considerable additional amount of an organic acid. Laboratory measurements have been made on the absorption of oleic acid (red oil) which have given indications that the reaction is dependent on the presence of the double bond in the acid, for stearic acid does not react in the same way. The resulting product is, however, more soluble in mineral oil than castor oil. However, the reaction suggests possibilities of producing more durable oils by substituting linseed oil acid or other drying oil acids for the oleic acid. This type of reaction has not been determined but is likely a re-esterification.
5. Condensation of raw castor oil with phthalic anhydride. This has been done in the laboratory by heating them together for about six hours at temperatures between 160° C. and 200° C. The resulting material is thinner or thicker according as less or more phthalic anhydride is used. 5% to 20% phthalic anhydride based on total mixture has been used. The resulting preparation is liquid, insoluble in mineral oils, and partly insoluble in alcohol. A definite reaction is indicated by a substantial decrease in the total acidity of the mixture. This reaction is probably a condensation but may be partly a re-esterification.
6. Condensation of castor oil which phenols and cresols castor oil breaks down on heating to form, among other things, heptaldehyde and undecylenic acid. The reaction does not take place appreciably at ordinary temperatures, but takes place very slowly at 150° C., and becomes active above 200° C. Phenols and cresols and other compounds of the same type, react with aldehydes to form resinous condensation products. The addition of phenol in relatively small amounts to castor oil permits the production of resins at high temperatures which give body to the oil after cooling. The resulting products are liquid, insoluble in mineral oils and give films of greater weather resistance than blown castor oil alone gives.

Pale blown castor oil may also be replaced by oils of other origin than the castor bean. Croton oil has properties closely resembling those of castor oil, and a similar constitution. It is the only other member of the "Castor oil group" or "Rinoleic acid group" of oils. Besides croton oil, linseed, rapeseed and other oils can be processed by treatment with sulphur chloride or by hydrogenation to give oils which are insoluble in mineral oils and which have great affinity for finishes. Such oils have not been tried experimentally. Another oil is called "Lacquer oil". It is insoluble in mineral oils but soluble in mineral spirits and may be substituted in the formula with fair results if the mineral spirits is omitted.

Although I mention the specific use of pale blown castor oil in our preferred formulae, it should be understood that other material of high refractive index, immiscible with the lubricant and capable of being applied in a disperse state to form glossy films may be used. Such materials would embrace castor oil condensed with polybasic acids to form viscous, highly light refractive compounds. Other oils derived from seeds or fruits of plants in the ricinus group—such as croton oil are examples of such materials.

Other products that may be used in lieu of castor oil are synthetic materials such as resins derived from the condensation of polybasic acids and polyhydric alcohols with or without modification with fatty acids; synthetic materials derived from the condensation of phenolic bodies and aldehydes; drying and semi-drying oils polymerized by heat, or chemical means to form substantially non-tacky films when applied. Such materials would include vegetable oils treated with sulphur chloride to render them substantially insoluble in petroleum derivatives, or vegetable oils hydrogenated to reduce tackiness after preliminary polymerization.

In general these alternatives for the pale blown castor oil must satisfy the following requirements:
1. A substance immiscible in water and mineral oil; viscosity at least 150 secs. at 100° C.; not over 1000 secs., preferably 400 to 500 secs.
2. High refractive index, comparable to that of resins, oils and nitrocellulose.
3. Compatible with or soluble in materials composing finishes.
4. Weather resistant, non-volatile, light resistant (any change due to weathering being of a constructive nature.)
5. High surface tension and film-forming properties—to permit leveling.
6. Good wetting properties and penetration—to insure maximum absorption.

There are a few liquid materials which are, like castor oil, essentially insoluble in mineral oil. These are mostly solvents, either volatile or non-volatile, without any great film-forming properties and without sufficient viscosity when used alone. However, these liquids have great penetration and affinity for finishes and the non-volatile ones are solvent plasticizers for such finishes. These solvents may be used to cut the viscosity of certain resins insoluble in mineral oils, or of combinations of these resins and castor oil, or of various blown castor oils so that the resulting blend has properties optimum for practical polishing. A list of such solvents is as follows:

Volatile:
1. Lactic esters, ethyl, butyl, amyl, etc.
2. Furfural and furfuryl alcohol.

Non-volatile:
1. Methoxyethylphthalate, ethoxyethylphthalate.
2. Triacetin (also possibly diacetin).
3. Glyceryl tribenzoate.

It will be obvious that this list may be extended.

Moreover, certain solvents, though miscible with mineral oil as well as castor oil, if included in a mixture of the two oils are preferentially absorbed by the castor oil phase. The solvents of this type, as far as my investigation has revealed, are the aliphatic alcohols of four carbon atoms or more, i. e., butyl, amyl, hexyl, heptyl, octyl alcohols.

There are available solvents that might be used to thin either blown castor oil or combinations of resins and castor oil, but which are unsuitable for use in the presence of water due to their great affinity for water.

There are also some resins that are soluble in castor oil and whose castor oil solutions can be substituted for blown castor oil. Such solution increases the body of the oil considerably so that either raw oil must be used or, if blown oil is used, some of the above-mentioned solvents or thinners must be included to reduce the viscosity of the polishing film for practical purposes. Such resins are:

1. Bakelite resins (Class I), XR820, XR821, XR254. 0–25% in raw castor oil without thinners. Give good results; limited by high cost; increases durability of film.
2. Resins, occurring naturally or derived from natural products such as shellac, pontianak and sandarac, and a treated natural resin derived from pine wood by extraction and heat treatment to yield a product having the following characteristics:

| | |
|---|---|
| Melting point_____degrees centigrade__ | 115 |
| Acid No._____ | 100 |
| Saponification No._____ | 158 |
| Unsaponifiable matter_____per cent__ | 6.5 |
| Petroleum naphtha (insoluble)____do____ | 98.5 |
| Toluol (insoluble)_____do____ | 60 |
| Petroleum ether (insoluble)_____do____ | 98.7 |
| Ash_____do____ | 0.04 |

Hereinafter I am referring to this product by its comon trade name as "Vinsol resin." 0–30% is dissolved in raw oil without thinners. Its film is more smeary than straight castor oil films, but might be commercially acceptable.

3. Certain glyceryl phthalate resins soluble in castor oil. "Glyptals" and "rezyls" are generally not compatible with castor oil, although certain ones are.
4. A phthalic anhydride—ricinoleic acid resin.

It should be understood that these resins can be used alone in suitable solution, in combination one with another, or with raw or blown castor oil. "Vinsol" resin is "a hard, black resin that is derived from pine wood. It is believed to consist chiefly of highly oxidized and highly polymerized abietic acid and terpenes."

Although I mention the use of mineral oil in my preferred formula, I wish it understood that any lubricant which is immiscible with castor oil or the like would fulfill the needs and spirit of my invention. Such lubricant could be a solution of a non-sticky, water soluble material such as agar-agar or lecithin.

The mineral oil can also vary considerably but gives best results within certain limits. Preferably the oil of petroleum origin should have physical characteristics as below:

Gravity: Over 32° Bé., preferably high.
Viscosity: 62–70 secs., Saybolt, at 100° F.
Color: Less than 2.0.
Cold test: Below 35° F.
Flash: Above 300° F.
Unsaturates: Below 10%.

The gravity only serves to indicate the field of origin and consequently its chemical constitution. The saturated chain compounds, paraffins, have the least solubility in castor oil and therefore serve best as lubricants. The higher the gravity the more saturated the oil, generally speaking. Unsaturates and cyclic compounds are undesirable because of their effect to increase miscibility of castor oil and the mineral oil. For this reason petroleum oil is preferred to shale oil and Pennsylvania oils to Mid-Continent or Mexican oils. However, quite satisfactory preparations have been made using Mid-Continent oils of 28° or 29° Bé. gravity. The viscosity, likewise, may vary considerably. A satisfactory polish may be made using 300 Miner's oil (a heavy kerosene) and also by using oils of 100 secs. (Saybolt at 100° F.)

The effect of the mineral spirits is to cut the viscosity of the mineral oil temporarily allowing more cleaning action until it evaporates, after which the substantially non-volatile mineral oil remains.

As appears in the formulae, a small amount of emulsifier is employed to stabilize the dispersion of the oils in water.

Gelatine and gums aid in the stabilization of the emulsion under certain rigorous conditions such as hot and freezing temperatures.

Ammonia combines readily with some of the free acid bodies, aldehydes and lactones to form soaps and other surface active compounds to stabilize the emulsion. Such an emulsion is very easily formed but the emulsifier of the present product has been found to give more stability. Triethanolamine is very similar to ammonia in its reaction and is used to replace it to give greater stability but is much more effective if fatty acids (oleic acid, et alia, of red oil) are added to permit quicker reaction.

Preferably, however, the soap of caustic potash and red oil is employed as the emulsifier because of better stability obtained.

Thus, although the specific use of a type of soap, i. e., a compound of a basic material and a fatty acid is mentioned as a stabilizer for the emulsion, it should be understood that it would not be departing from the spirit of our invention to stabilize the dispersion with other colloiding materials such as sulphated fatty alcohols, dispersions of casein in alkali, vegetable gums or gelatine.

The orthodichlorbenzene is an efficient solvent for tar and road oil and helps to clean such materials from the finish, and to disperse them in the mineral oil, which is largely absorbed by the polishing pad.

Although the specific use of ortho-dichlor-benzene is mentioned in the preferred formula, other material of high solvent power for tar, wax or grease, which is water insoluble, but miscible with petroleum derivatives would fulfill the spirit of the invention. Such materials would embrace other halogenated hydrocarbons such as para-dichlor-benzene, tetra and/or hexa-hydronaphthalene, solvent naphtha, or pine oil, or mixtures of any of these types of materials. Oil of citronella substitute is a perfume employed for overcoming the unpleasant odor of the castor oil.

In one process for making my product, I pump all the measured water and the triethanolamine into the emulsifier or preliminary mixer. In another tank, the light red oil, solvent, orthodichlorbenzene, perfume, pale blown castor oil, neutral and spindle oil are mixed. After mixing these, they are then pumped up into the emulsifier and emulsified with the water while flowing in.

In the product using caustic potash as emulsifying agent, the method of manufacture is reversed; that is, all of the oils are first mixed and pumped into the emulsifier and then the water containing the caustic potash is pumped into the mixer containing the oils while mixing. This is a definite improvement for stability inasmuch as it itself serves in the mixing. The oil normally is on the external phase until approximately 50% of the water has been admitted. Then automatically the phase itself inverts, placing the oil as internal phase and water as external phase. Although this formula gives a much more stable product it is improved upon from a stability standpoint as well as increasing the viscosity by incorporating gums.

This is done by mixing powdered gum arabic and powdered gum tragacanth in the ratio of three-fourths arabic and one-fourth tragacanth, into the oil mixture so that they would be well dispersed and each particle separated. Because of being insoluble in the oil, when the water is pumped into this oil mixture and comes in contact with each particle of gum, instead of agglomerates of gums, the maximum dispersion of the gums almost instantly, as well as the maximum viscosity are achieved.

From the mixer, the emulsion is carried to the homogenizer where the emulsion is carried through adjustable valves in a homogenizer by pressure pumps developing pressures up to four thousand pounds per square inch for breaking up the oil globules into minute particles. This pressure is governed by the opening between the valve and the valve seat. The closure the valve is seated, the higher the pressure and theoretically the smaller the oil globule.

I have discovered that most satisfactory results both from the point of view of creaming and from economy of operation are apparent at a pressure in a homogenizer in the order of two thousand pounds per square inch, either in a single or a series of successive stages.

From the homogenizer, the polish is carried to the storage tank and thence to the filling machines as illustrated.

Heretofore, in using colloid mills, I have found it next to impossible to reduce the oil globules below an average particle size of 5 mu, whereas part of the same batch of polish that had been processed through the colloid mill was then processed through the homogenizer and I found that at 2000 pounds per square inch the greater percentage of the oil globules was invisible and there were very few approaching 5 mu.

The function of breaking up the emulsion molecules is accomplished by the homogenizing valve which is made of a high speed steel such as "Steelite". The under side of the valve tappet has four radial fins designed to permit the valve to turn slightly by absorption of energy from the stream of liquid passing through it. This ability to turn is given the valve in order to prevent, to a large extent, scoring due to liquid always passing through the valve in the same place. Because of the fact that the emulsified polish is passed through this valve at such pressure and with such velocity, not only is it broken up in passing through the valve, but also in striking the outside walls at such high velocity, it is further dispersed.

The homogenizer breaks up the particles into a cream, increasing the stability of the emulsion to such an extent that I have found that I can maintain a state of suspension of a bottle of my polish lying on the shelf undiluted for many months.

From the above, it will now be clear that my novel polish has many possible modifications without departing from the spirit of this invention.

Moreover, although a specific flow sheet has been shown for purposes of illustration, it will be obvious that this may be modified within the spirit of my invention, and I do not intend to be limited except as set forth in the appended claims.

I claim:

1. A polish comprising a homogenized emulsion of the following composition:

| | Percent |
|---|---|
| Water | 50.69 |
| Mineral oil | 25.85 |
| Blown castor oil | 10.16 |
| Triethanolamine | 0.68 |
| Red oil | 0.90 |
| Orthodichlorbenzene | 2.92 |
| Mineral spirits | 7.72 |
| Oil citronella substitute | 0.92 |
| Gelatine | 0.15 |

2. A polish comprising a homogenized emulsion of the following composition:

| | Percent |
|---|---|
| Water | 52.87 |
| 46% caustic potash | 0.40 |
| Red oil | 0.82 |
| Mineral spirits | 8.94 |
| Orthodichlorbenzene | 0.99 |
| Blown castor oil | 9.49 |
| Mineral oil | 25.67 |
| Oil citronella substitute | 0.68 |

3. A polish comprising a homogenized emulsion of the following composition:

| | Percent |
|---|---|
| Red oil | 0.81 |
| Mineral spirits | 7.48 |
| Oil citronella substitute | 0.54 |
| Orthodichlorbenzene | 1.24 |
| Blown castor oil | 8.14 |
| Mineral oil | 24.26 |
| Gum arabic | 0.034 |
| Gum tragacanth | 0.011 |

4. A polish comprising a homogenized emulsion of the following composition:

| | Percent |
|---|---|
| Red oil | 0.81 |
| Mineral spirits | 7.48 |
| Oil citronella substitute | 0.54 |
| Orthodichlorbenzene | 1.24 |
| Blown castor oil | 8.14 |
| Mineral oil | 24.26 |
| Gum arabic | 0.034 |
| Gum tragacanth | 0.011 |
| Water | 56.89 |
| 46% caustic potash | 0.45 |
| Gelatine | 0.136 |

5. A polish comprising a homogenized emulsion of the following composition:

| | |
|---|---|
| Water | 50 –70 |
| Red oil | 2.0– 0.5 |
| Mineral spirits | 15 – 9.0 |
| Orthodichlorbenzene | 5.0– 1.0 |
| Oil citronella substitute | 2.5– 1.0 |
| Blown castor oil | 15 – 6.0 |
| Mineral oil | 35 –20 |
| 46% caustic potash | 2.0– 0.2 |
| Gelatine | 0.5– 0.1 |
| Gum arabic | 0.5– 0.1 |
| Gum tragacanth | 0.5– 0.1 |

6. A rubbing polish composition in the form of an oil in water emulsion comprising water as a continuous phase and a petroleum distillate as a discontinuous phase, and dispersed in the petroleum distillate blown castor oil, the blown castor oil being insoluble in the petroleum distillate and insoluble in the water, said polish emulsion being homogenized to render it stable, the homogenized oil globules being of a size on the order of 5 mu or less, the homogenization being effected by a pressure on the order of 2,000 pounds per square inch.

7. A polish composition in the form of an oil in water emulsion comprising water as a continuous phase and a petroleum distillate as a discontinuous phase, and dispersed in the petroleum distillate blown castor oil, the blown castor oil being insoluble in the petroleum distillate and insoluble in the water, said polish emulsion being homogenized to render it stable, the homogenized oil globules being of a size on the order of 5 mu or less.

JOSEPH A. TUMBLER